US009030569B2

(12) United States Patent
Ohba et al.

(10) Patent No.: US 9,030,569 B2
(45) Date of Patent: May 12, 2015

(54) MOVING IMAGE PROCESSING PROGRAM, MOVING IMAGE PROCESSING DEVICE, MOVING IMAGE PROCESSING METHOD, AND IMAGE-CAPTURING DEVICE PROVIDED WITH MOVING IMAGE PROCESSING DEVICE

(75) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Corporation Entertainment Inc., Tokyo (JP)

( * ) Notice: Subject to any disclaimer, the term of this patent is extended or adjusted under 35 U.S.C. 154(b) by 257 days.

(21) Appl. No.: 13/504,349

(22) PCT Filed: Jul. 13, 2010

(86) PCT No.: PCT/JP2010/004545
§ 371 (c)(1),
(2), (4) Date: Apr. 26, 2012

(87) PCT Pub. No.: WO2011/052114
PCT Pub. Date: May 5, 2011

(65) Prior Publication Data
US 2012/0218438 A1    Aug. 30, 2012

(30) Foreign Application Priority Data
Nov. 2, 2009  (JP) .................................. 2009-252148

(51) Int. Cl.
*H04N 7/16*    (2011.01)
*H04N 7/14*    (2006.01)
(Continued)

(52) U.S. Cl.
CPC ................. *H04N 7/163* (2013.01); *H04N 7/14* (2013.01); *H04N 21/234327* (2013.01); *H04N 21/4122* (2013.01); *H04N 21/4223* (2013.01); *H04N 21/440263* (2013.01)

(58) Field of Classification Search
CPC ... H04N 7/17309; H04N 7/102; H04N 7/173; H04H 20/78; H04H 20/12

USPC .................... 348/222.1; 725/125; 382/167
See application file for complete search history.

(56) References Cited

U.S. PATENT DOCUMENTS

| 7,200,247 B2 | 4/2007 | Ohba |
| 7,620,206 B2 | 11/2009 | Ohba |

(Continued)

FOREIGN PATENT DOCUMENTS

| CN | 1510927 A | 7/2004 |
| CN | 101389014 A | 3/2009 |

(Continued)

OTHER PUBLICATIONS

Office Action issued for corresponding Japanese Patent Application No. 2009-252148, dated Nov. 27, 2012.

(Continued)

*Primary Examiner* — Twyler Haskins
*Assistant Examiner* — Fayez Bhuiyan
(74) *Attorney, Agent, or Firm* — Matthew B. Dernier, Esq.; Gibson & Dernier LLP

(57) ABSTRACT

A camera outputs to a host terminal a moving image for display on a display. An image acquisition unit acquires an unprocessed image captured using an imaging element. A simple demosaic processing unit performs a demosaic process on the unprocessed image. A pyramid filter unit converts the unprocessed image into a plurality of reduced images whose resolutions vary in stages. An image transmission unit is provided with a selection unit for selecting a part of the unprocessed image as a specific part and also selecting any one of the plurality of reduced images as a specified reduced image. The specific part of the unprocessed image and the specified reduced image that have been selected are transmitted to a host terminal by a communication unit for a further image process.

16 Claims, 8 Drawing Sheets

(51) Int. Cl.
*H04N 21/2343* (2011.01)
*H04N 21/41* (2011.01)
*H04N 21/4223* (2011.01)
*H04N 21/4402* (2011.01)

(56) References Cited

U.S. PATENT DOCUMENTS

| | | | |
|---|---|---|---|
| 7,817,850 B2 | 10/2010 | Atsumi | |
| 2003/0142872 A1* | 7/2003 | Koyanagi | 382/236 |
| 2004/0223058 A1* | 11/2004 | Richter et al. | 348/207.1 |
| 2004/0240740 A1 | 12/2004 | Ohba | |
| 2005/0042211 A1* | 2/2005 | Kenoyer et al. | 424/94.3 |
| 2006/0101080 A1* | 5/2006 | Atsumi et al. | 707/200 |
| 2006/0239574 A1 | 10/2006 | Brower | |
| 2007/0110279 A1 | 5/2007 | Ohba | |

FOREIGN PATENT DOCUMENTS

| | | |
|---|---|---|
| EP | 0999518 A1 | 5/2000 |
| JP | 05328342 A | 12/1993 |
| JP | 06090444 A | 3/1994 |
| JP | 06153017 A | 5/1994 |
| JP | 2006340091 A | 12/2006 |
| JP | 2007074371 A | 3/2007 |
| WO | 2004004361 A1 | 1/2004 |

OTHER PUBLICATIONS

Office Action issued for corresponding Australian Patent Application No. 2010313042, dated Aug. 7, 2013.
Office Action issued for corresponding Mexican Patent Application No. MX/a/2012/005076, dated Jul. 12, 2013.
International Search Report for corresponding PCT Application PCT/JP2010/004545, dated Aug. 10, 2010.
International Preliminary Report on Patentability and Written Opinion for corresponding PCT Application PCT/JP2010/004545, dated Jun. 12, 2012.
Office Action issued for corresponding Chinese Patent Application No. 201080049361.5, dated Mar. 25, 2014.

* cited by examiner

MOVING IMAGE PROCESSING PROGRAM, MOVING IMAGE PROCESSING DEVICE, MOVING IMAGE PROCESSING METHOD, AND IMAGE-CAPTURING DEVICE PROVIDED WITH MOVING IMAGE PROCESSING DEVICE

TECHNICAL FIELD

The present invention relates to a technique for transmitting to a host terminal an image created by an imaging element provided on a camera.

BACKGROUND ART

In the related art, games are known in which the image of a part of a user's body such as a head is captured by a video camera, in which a predetermined area for an eye, a mouth, a hand, or the like is then extracted, and in which the area is replaced with another image for display on a display (for example, patent document No. 1). A user interface is also known that receives, as an instruction for operating an application, the movement of a mouth or a hand captured by a video camera.
[patent document No. 1] European Patent Application No. 0999518

In a technique such as the one described above, a high-resolution image is necessary for extracting a predetermined area for a user's mouth, hand, or the like. However, as the performance of an imaging element of a video camera becomes higher, it takes longer for performing a compression process when the video camera transmits an image to a host such as a game device or a personal computer after the compression. Therefore, there is a problem where latency between image capturing by the camera and video outputting by the host is increased. The use of the camera as a user interface creates a problem where an increase in the latency dramatically reduces usability. As described, even when the performance of an imaging element of a video camera is increased, the performance of a system as a whole may be reduced.

SUMMARY OF THE INVENTION

In this background, a purpose of the present invention is to provide an image processing technique for reducing latency associated with image transmission from a camera to a host while using a high-performance imaging element.

An embodiment of the present invention relates to a moving image processing program. The moving image processing program that operates in a moving image processing device, allowing the moving image processing device to achieve: an image acquisition module configured to acquire an unprocessed image that is captured using an imaging element; a demosaicing module configured to perform a demosaic process on the unprocessed image; a filtering module configured to convert the unprocessed image into a plurality of reduced images whose resolutions vary in stages; a selection module configured to select a part of the unprocessed image as a specific part and also to select any one of the plurality of reduced images as a specified reduced image; and a transmission module configured to transmit to a host terminal for further image processing the specific part of the unprocessed image and the specified reduced image that have been selected.

According to this embodiment, only a specific part that is a part of an unprocessed image and a specified reduced image are transmitted from the moving image processing device to the host terminal. Therefore, while a specific part can be processed freely in the host terminal, the amount of data transmitted to the host terminal becomes smaller compared to when an entire unprocessed image is transmitted. Accordingly, latency associated with image transmission can be reduced while keeping the amount of freedom for an image process in the host terminal.

Another embodiment of the present invention also relates to a moving image processing program. The moving image processing program that operates in a host terminal that processes a moving image that is captured by an image-capturing device and then output the processed moving image to a display, allowing the host terminal to achieve: a module configured to receive both a specific part that is a part of an unprocessed image output from an imaging element and a reduced image obtained by performing a demosaic process and a reduction process on the unprocessed image; a module configured to perform the demosaic process on the specific part of the unprocessed image; a module configured to convert the reduced image into a full-size image by enlarging the reduced image to a size equal to that of the unprocessed image; and a module configured to combine the specific part on which the demosaic process has been performed and the full-size image so as to output a synthesized image with partially different resolutions to the display.

According to the embodiment, a demosaic process can be performed in the host terminal on a specific part of a raw image captured by the imaging element. Therefore, a high image-quality demosaic process can be performed utilizing a computational resource of the host terminal whose processing capacity is normally higher than that of the image-capturing device. Since a reduced image is enlarged for use for a part other than the specific part, the amount of data received from the image-capturing device can be reduced. Therefore, the latency associated with image communication can be suppressed.

Implementations of the invention in the form of methods, systems, computer programs, and recording mediums storing computer programs may also be practiced as additional modes of the present invention.

According to the present invention, a high-resolution partial image using a raw image can be obtained for a specific part while reducing latency associated with image communication from an image-capturing device to a host terminal.

DETAILED DESCRIPTION OF THE INVENTION

Figure 1:
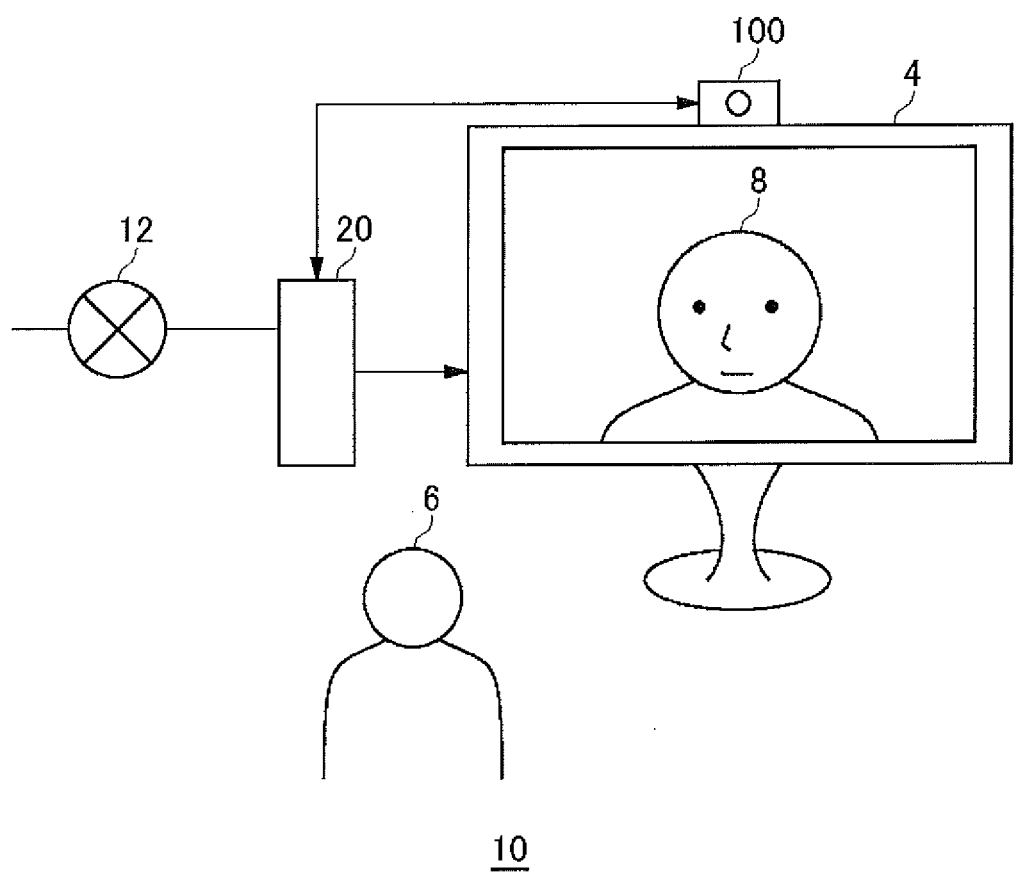
FIG. 1 is a diagram illustrating the whole configuration of a low-latency camera system according to an embodiment of the present invention.

FIG. 1 illustrates the whole configuration of a low-latency camera system 10 according to an embodiment of the present invention. In this system, the moving image of a user 6 is captured by a camera 100, and an image process is performed on the moving image in a host terminal 20. Then, an image of the user is shown on a display 4 or transmitted to a predetermined communication destination via a network 12 such as the Internet or a LAN (Local Area Network).

The camera 100 is a digital video camera provided with an imaging element such as a CCD (Charge Coupled Device) or a CMOS (Complementary Metal Oxide Semiconductor) and is provided on the top of a housing of the display 4 as shown in the figure. The display 4 is, for example, a liquid crystal television, a plasma television, a PC display, or the like. Normally, the user 6 stands in front of the display 4 such that an image of the entire or a part of the body of the user is captured by the camera 100. An image shown on the display 4 varies depending on an application run in the system 10. For example, when the system 10 is used as a user interface (UI) that recognizes the movement or expression of the user 6 and interprets the movement or expression as some sort of operation instruction, an image 8 shown on the display 4 is an image of a part of the user 6, such as a face or a hand, or of the entire body. When the system 10 is used for video chatting, the image 8 shown on the display 4 is an image of a face of a chat partner, and an image of the user 6 is shown on a chat partner's display via the network 12.

In light of a mode of use such as those described above, the camera 100 is most suitably provided on top of the display 4. However, as long as an image of the entire or a part of the body of the user 6 can be captured, the camera 100 may be placed at a location other than the proximity of the display 4, e.g., in the proximity of the host terminal 20 or around the user. In stead of providing the camera 100 as a single structure, the camera 100 may be embedded in the housing of the display 4 or the like. Instead of using an imaging element in the camera 100, an analog image may be analog-to-digital (A/D) converted for use.

The host terminal 20 is a computer terminal such as a personal computer or a game device that is provided with an image processing function. The host terminal 20 sequentially takes in, in chronological order, moving images obtained by the image capturing of the user 6 by the camera 100 and performs a predetermined image process. In the case of a video chat application, an image of the user 6 on which the image process has been performed is transmitted to a chat partner via the network 12 in real time. In the case of a user interface application, a mirror process is further performed, and the image is then output to the display 4 in real time. The mirror process is a process of creating an image in a right-and-left inverted manner, which allows the user to operate the system as if the user is looking at a mirror. In addition to the above image process, the host terminal 20 is also capable of synthesizing an object image such as a menu or a cursor for the execution of various applications and then displaying the synthesized image on the display 4.

In an application for a game, chatting, etc., that uses a conventional camera, the camera often takes on a function of an image recognition process and an image compression process. With poor computational resources of the camera, it generally tends to take more time for performing the processes compared to a host terminal. Therefore, real time performance is often impaired, for example, in situations where it takes time to recognize the movement of the user and where there is a time lag in the display of images shown on a display. This tendency becomes more pronounced with an increase in the number of pixels of an imaging element provided in the camera.

Thus, in the present embodiment, a plurality of images whose resolutions vary in stages are prepared in the camera, and only an image portion with a necessary resolution is transmitted from the camera to the host terminal according to the type of an application that is run in a system so that a high quality process is performed in the host terminal having sufficient computational resources.

Figure 2:
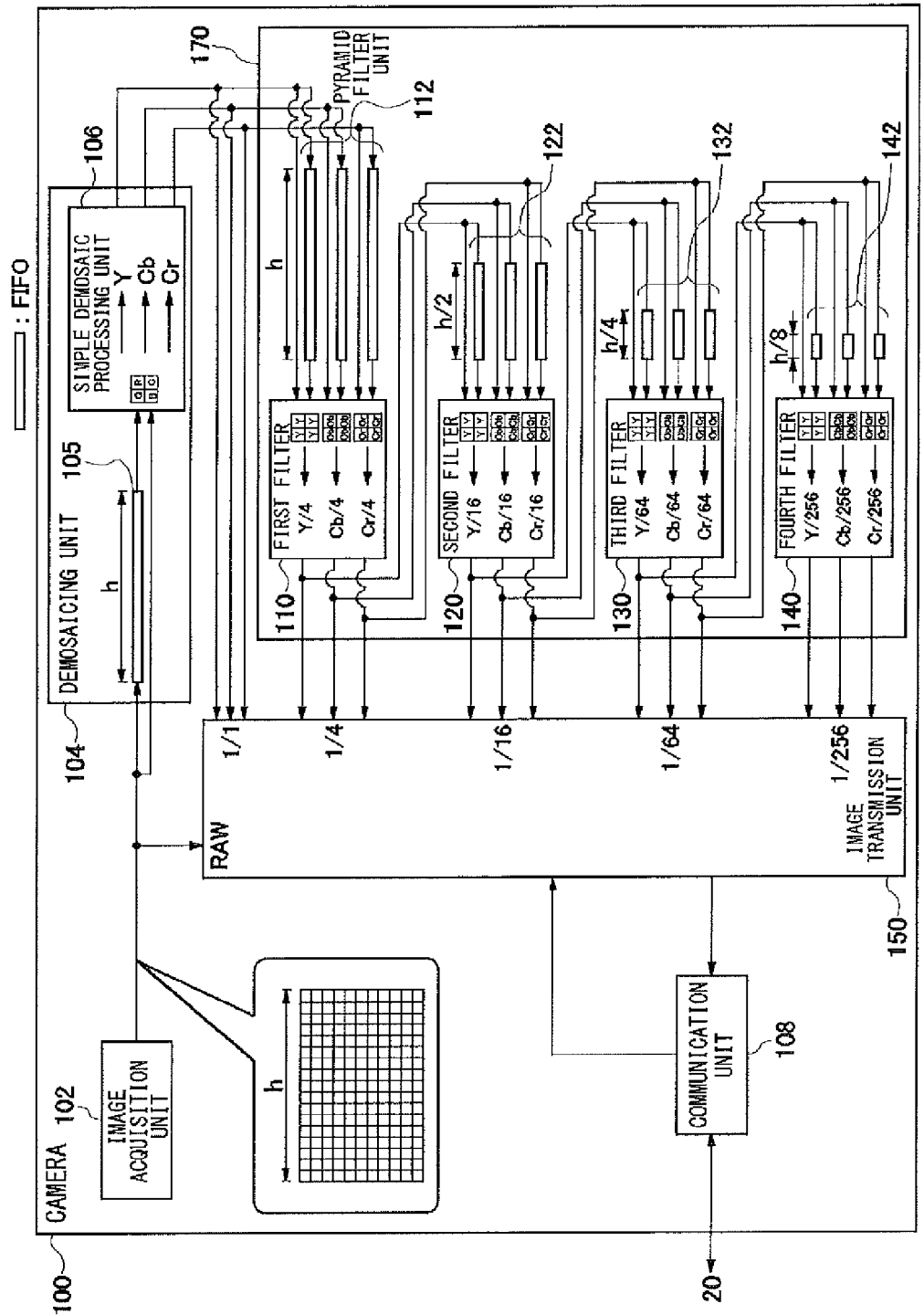
FIG. 2 is a diagram illustrating the configuration of a camera according to an embodiment.

FIG. 2 illustrates the configuration of the camera 100 according to the embodiment. These configurations thereof can be implemented by configurations such as a CPU (Central Processing Unit), a RAM (Random Access Memory), a ROM (Read Only Memory) and a rendering circuit in terms of hardware, and by programs for providing various functions such as data input, data storage, image processing, and rendering in terms of software. FIG. 2 illustrates functional blocks implemented by the cooperation of those components. Therefore, these functional blocks may be implemented in a variety of forms by combinations of hardware and software. In order to facilitate the explanation, FIG. 2 includes a schematic diagram illustrating an image portion processed in each functional block.

The camera 100 comprises an image acquisition unit 102, a demosaicing unit 104, an image transmission unit 150, a pyramid filter unit 170, and a communication unit 108. The image acquisition unit 102 reads, at predetermined timing (e.g., 60 times/sec), an image exposed by an imaging device such as a CCD or a CMOS. In the following explanation, it is assumed that this image has a width of "h" pixels in a horizontal direction. This image is a so-called RAW image. The image acquisition unit 102 transmits the RAW image to the demosaicing unit 104 and the image transmission unit 150 every time the exposure is completed for a single horizontal row of the RAW image.

The demosaicing unit 104 has a FIFO (First In First Out) buffer 105 having a capacity of h pixels and a simple demosaic processing unit 106. Pixel information of a single horizontal row of the RAW image is input and stored in the FIFO buffer 105 until pixels for a subsequent horizontal row is input in the demosaicing unit 104. Upon receipt of the pixels for the two horizontal rows, the simple demosaic processing unit 106 performs, using the received pixels, a demosaic process of complementing color information for each pixel based on the surrounding pixels thereof and then creating a full-color image. As known to a skilled person, there are many methods for this demosaic process. However, a simple demosaic process that uses only the pixels for two horizontal rows is sufficient in this case. As an example, when a pixel for which a corresponding YCbCr value is to be calculated has only a G value, an RGB value is obtained by using an R value obtained by taking an average of the respective R values of right and left adjacent pixels, the G value, and a B value of a pixel above or below the pixel for an R value, a G value, and a B value thereof, respectively, and then substituted into a predetermined conversion equation so as to calculate the YCbCr value. Since such a demosaic process is well known, a further detailed explanation thereof is omitted.

The reason for why a simple demosaic process is sufficient is as described hereinafter. For a part in which a high-quality image is necessary (the part is hereinafter referred to as a "specific part"), the host terminal 20 receives a RAW image from the camera 100 and performs a process. Therefore, the quality of an image is not important for a part other than the specific part, or a part other than the specific part is used only for image detection or the like. Accordingly, the quality of an image after demosaicing does not matter too much. In one variation of a simple demosaic process, a method of forming a YCbCr value of a single pixel from four pixels of RGB may be used. In this case, a demosaiced image of ¼ the size of the RAW image can be obtained. Thus, a first filter 110 described later is not necessary.

As shown in the figure, the simple demosaic processing unit 106 converts RGB of four pixels, which are two horizontal pixels by two vertical pixels, into YCbCr color signals, for example. A block composed of these four pixels is transferred to the image transmission unit 150 as a 1/1 demosaic image and is also transmitted to the pyramid filter unit 170.

The pyramid filter unit 170 has a function of hierarchizing a given image into a plurality of resolutions and outputting the hierarchized image. A pyramid filter is provided with ¼ reduction filters based on the number of levels of resolutions that are necessary in general. In the embodiment, the pyramid filter has four-level filters: a first filter 110 through a fourth filter 140. Each filter performs a process of bilinear interpolating four pixels that are adjacent to one another and then computing an average pixel value of the four pixels. Therefore, an image size obtained after the process becomes ¼ the size of the image before the process.

Before the first filter 110, a single FIFO buffer 112 for h pixels is correspondingly provided for each of Y, Cb, and Cr signals. These FIFO buffers 112 each have a role of storing YCbCr pixels for a single horizontal row until pixels for a subsequent horizontal row are output from the simple demosaic processing unit 106. The storage time of the pixels is determined according to the line scan speed of an imaging element. Upon the input of the pixels for two horizontal rows, the first filter 110 averages Y, Cb, and Cr pixel values for four pixels of two horizontal pixels by two vertical pixels. By repeating this process, the length of a 1/1 demosaiced image becomes ½ both vertically and horizontally such that the image is converted to have ¼ the size as a whole. The converted ¼ demosaiced image is transmitted to the image transmission unit 150 and is also transferred to the subsequent second filter 120.

Before the second filter 120, a single FIFO buffer 122 for h/2 pixels is correspondingly provided for each of Y, Cb, and Cr signals. These FIFO buffers 114 each also have a role of storing YCbCr pixels for a single horizontal row until pixels for a subsequent horizontal row are output from the first filter 110. Upon the input of the pixels for two horizontal rows, the second filter 120 averages Y, Cb, and Cr pixel values for four pixels of two horizontal pixels by two vertical pixels. By repeating this process, the length of the ¼ demosaiced image becomes ½ both vertically and horizontally such that the image is converted to be 1/16 the size as a whole. The converted 1/16 demosaiced image is transmitted to the image transmission unit 150 and is also transferred to the subsequent third filter 130.

In front of each of the third filter 130 and the fourth filter 140, FIFO buffers 132 for h/4 pixels and FIFO buffers 142 for h/8 pixels are provided, respectively. Other than this, the same process as those described above is repeated in the third filter 130 and the fourth filter 140. The demosaiced images of 1/64 the size and 1/256 the size are then transmitted to the image transmission unit 150. Since a pyramid filter such as those shown above is well known, as described in patent document No. 1, a further detailed explanation thereof is omitted in the subject specification.

As described, outputs of images reduced to be ¼ one by one are input to the image transmission unit 150 from the respective filters of the pyramid filter unit 170. As is evident from this, the size of a FIFO buffer that is necessary before each filter becomes smaller as the number of passed filters becomes large in the pyramid filter unit 170.

According to an instruction received from the host terminal 20 via the communication unit 108, the image transmission unit 150 selects a necessary image from among the RAW image received from the image acquisition unit 102, the 1/1 demosaiced image received from the demosaicing unit 104, and ¼ through 1/256 demosaiced images received from the pyramid filter unit 170. The image transmission unit 150 composes a packet using these images and then transmits the packet to the communication unit 108.

The communication unit 108 transmits the packet to the host terminal 20 in accordance with, for example, a predetermined protocol such as USB 1.0/2.0, or the like. The communication with the host terminal 20 is not limited to a wired communication. For example, the communication may be wireless LAN communication such as IEEE 802.11a/b/g, or the like or infrared communication such as IrDA, or the like.

Figure 3:
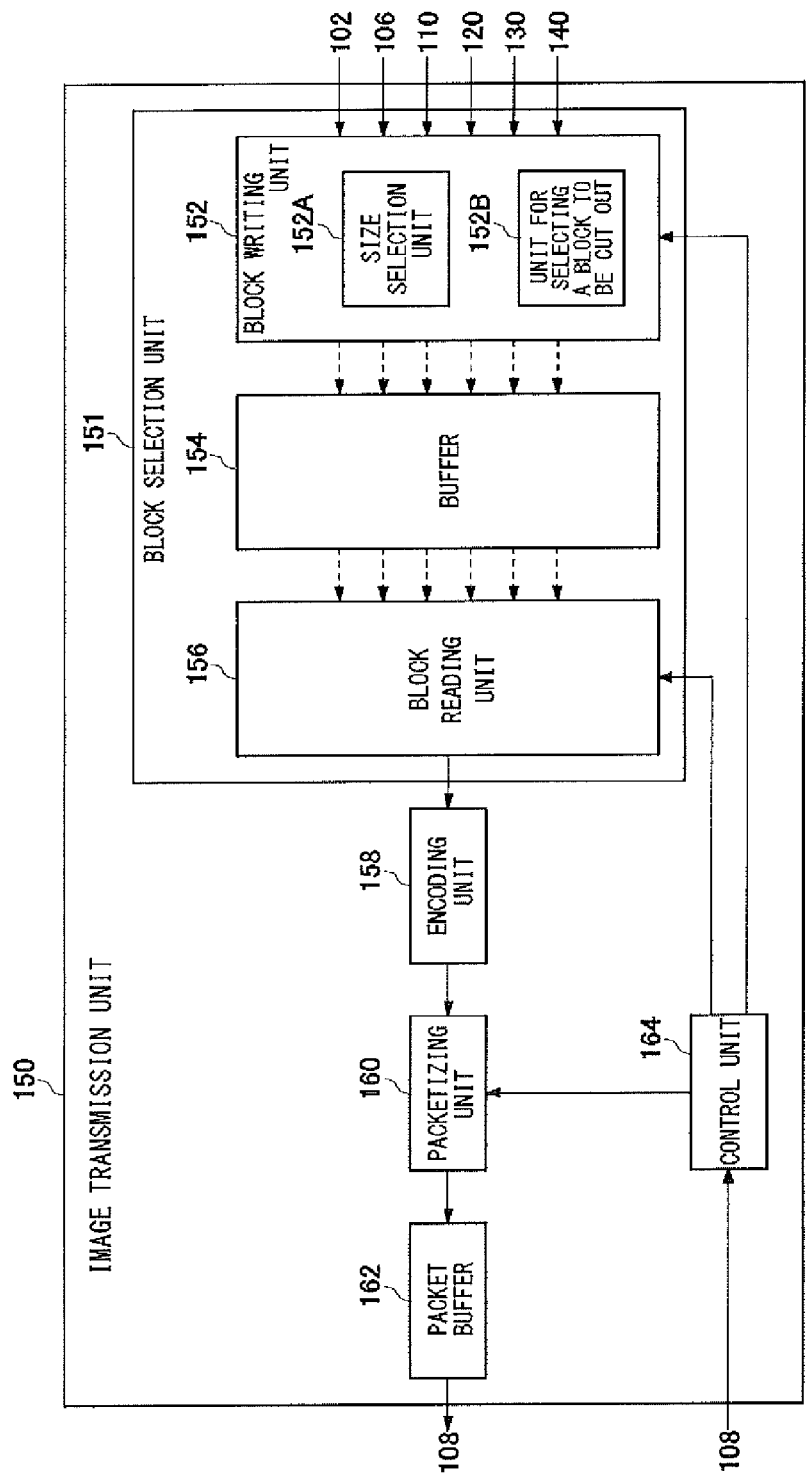
FIG. 3 is a diagram illustrating the configuration of an image transmission unit of the camera shown in FIG. 2.

FIG. 3 is a diagram illustrating the configuration of the image transmission unit 150 of the camera 100. The image transmission unit 150 comprises a block writing unit 152, a buffer 154, a block reading unit 156, an encoding unit 158, a packetizing unit 160, a packet buffer 162, and a control unit 164.

Based on the instruction from the host terminal 20, the control unit 164 indicates to the block writing unit 152 and the block reading unit 156 the image data to be transmitted as a packet from among various image data sets. As described later, only a part the RAW image and the demosaiced images that have been input to the image transmission unit 150 is transmitted to the host terminal in the embodiment.

To the block writing unit 152, a RAW image is input from the image acquisition unit 102, and demosaiced images of 1/1 through 1/256 the size are input via the demosaicing unit 104 and the pyramid filter unit 170. A size selection unit 152A of the block writing unit 152 writes a part of the demosaiced images in the buffer 154 based on an instruction from the control unit 164. The block writing unit 152 receives an image in a unit of two by two pixels as shown in FIG. 2 and operates to sequentially write the image in the buffer 154. A unit 152B for selecting a block to be cut out of the block writing unit 152 writes, with regard to a RAW image, only a block containing a specific part, which is indicated by the control unit 164, in the buffer 154. This specific part is, for example, a part for which a high image-quality and high-resolution image is necessary such as a part for a user's face, hand, or the like. A further description on the unit 152B for selecting a block to be cut out will be given later.

The block reading unit 156 reads each image block and then transmits the image block to the encoding unit 158 in the order of pixels for one block which are prepared in the buffer 154. The block writing unit 152 and the block reading unit 156 are adjusted so as to operate synchronously by the control unit 164. In other words, while the writing by the block writing unit 152 is performed every time pixels are output from the image acquisition unit 102, the demosaicing unit 104, and the pyramid filter unit 170, the reading by the block reading unit 156 is performed every time pixels for one block are accumulated in the buffer 154. The synchronization timing is determined according to the exposure speed of the imaging element. A single block is preferably a block having a size of eight by eight pixels in accordance with JPEG encoding that follows subsequently. In the explanation below, a block of the RAW image is referred to as Br, and blocks of the demosaiced images of ¼, ¹⁄₁₆, ¹⁄₆₄, and ¹⁄₂₅₆ the size are referred to as B1, B4, B16, B64, and B256, respectively.

In the embodiment, instead of transmitting pixels to the host terminal when pixels for the entire RAW image or the entire reduced images become complete, pixels are transmitted in units of blocks. Thus, the size of the buffer 154 large enough to store all image blocks for the RAW image and the reduced images at most is sufficient. Depending on the type of an application, it is only necessary to be able to store two to three image blocks. As described, data to be buffered is reduced, and data is sequentially packetized every time a block becomes prepared and then transferred. Thus, latency associated with a process performed within the camera is reduced. Pixels are sequentially output from the image acquisition unit 102 and the pyramid filter unit 170 to the block writing unit 152 every time the exposure by the imaging element is completed. Thus, it is impossible, from the structural aspect, for a block of a different frame to be written in the buffer 154 or a block to be packetized and then transmitted in a different order.

The unit 152B for selecting a block to be cut out receives position information of a specific part transmitted from the host terminal 20 and selects as a specific block a block including an area that is larger than the area that accounts for the specific part by a predetermined number of pixels.

The encoding unit 158 performs well-known compression encoding such as JPEG or the like on an image block of the reduced images other than the RAW image and then transmits the compression encoded image block to the packetizing unit 160. The packetizing unit 160 packetize a RAW image block and an encoded image block of a reduced image in the order of arrival at the packetizing unit 160 and writes the packetized image blocks in the packet buffer 162. The communication unit 108 transmits a packet in the packet buffer 162 to the host terminal 20 in accordance with a predetermined communication protocol. Other well-known encoding such as LLVC, AVC, etc., can be used. However, those that are capable of performing encoding in units of blocks are preferred. The size of a block read out by the block reading unit 156 can be changed in accordance with the encoding. For example, reading and encoding may be performed using a block in units of 256 by 256 pixels.

Figure 4:
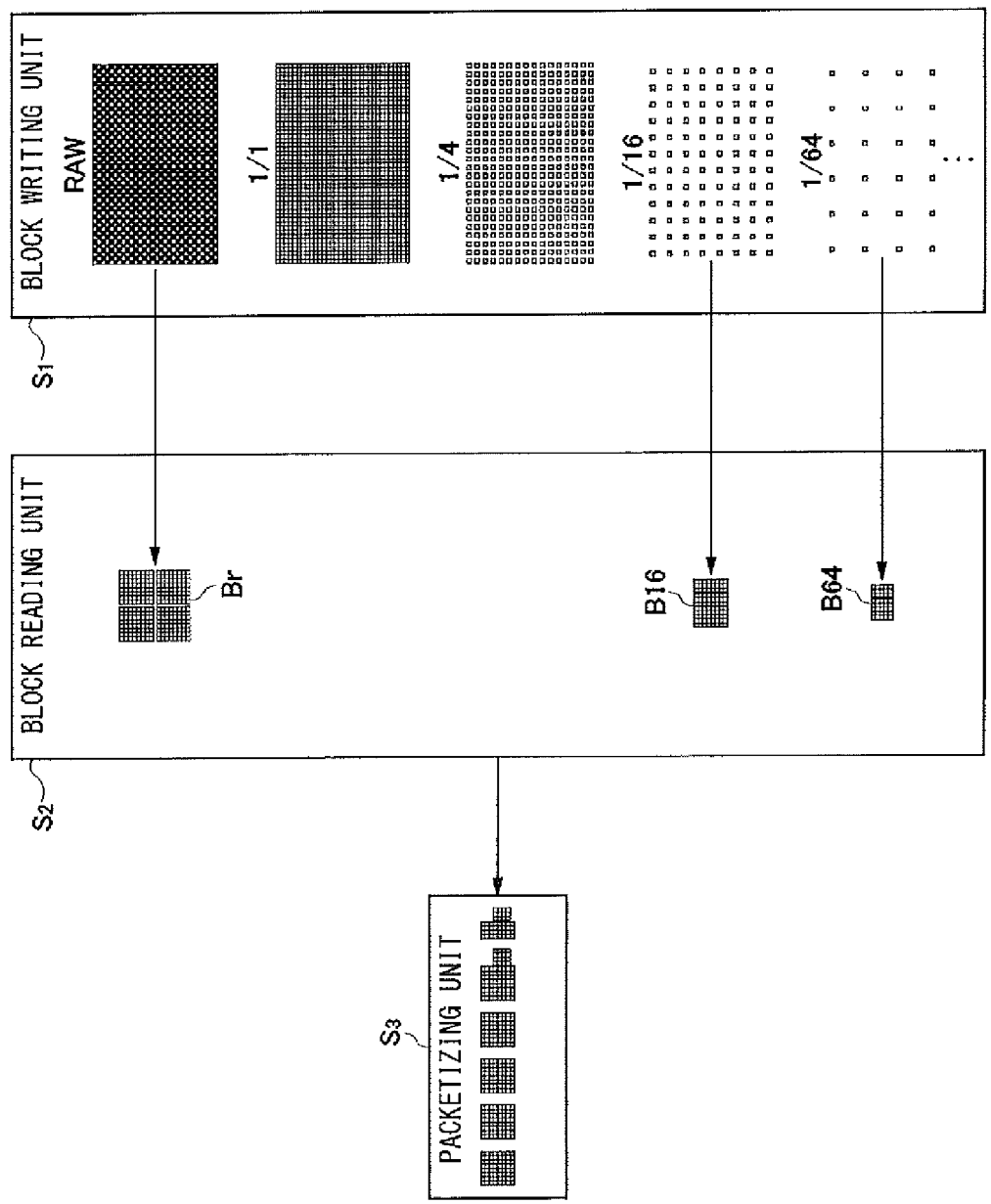
FIG. 4 is a diagram illustrating a function of the image transmission unit.

Then, an explanation is given of the action of the image transmission unit 150 using FIG. 4. A right column S1 shows a RAW image and demosaiced images received by the block writing unit. A small square represents one pixel. Note that a square corresponds to one pixel value of any one of R, G, and B in a RAW image and that one pixel contains all the YCbCr signals in a demosaiced image. The density of a square shows that pixels have been reduced by the pyramid filter. According to an instruction from the control unit 164, the block writing unit writes only some images, among these images that have been output thereto, in the buffer. In this example, it is assumed that a RAW image and ¹⁄₁₆ and ¹⁄₆₄ demosaiced images are selected. For the RAW image, only a block containing a specific part is selected. As a result, a block reading unit shown in a middle column S2 in the figure reads four RAW image blocks Br, a ¹⁄₁₆ demosaiced image block B16, and a ¹⁄₆₄ demosaiced image block B64 from the buffer. Note that, in reality, blocks are not directly passed to the block reading unit from the block writing unit and that the block reading unit reads blocks in units of blocks after blocks of a predetermined size are accumulated in the buffer.

Regarding the blocks that have been read, the demosaiced image blocks B16 and B64 go through an encoding process and then become packetized along with the RAW image blocks as shown in a left column S3 in the figure.

Figure 5:
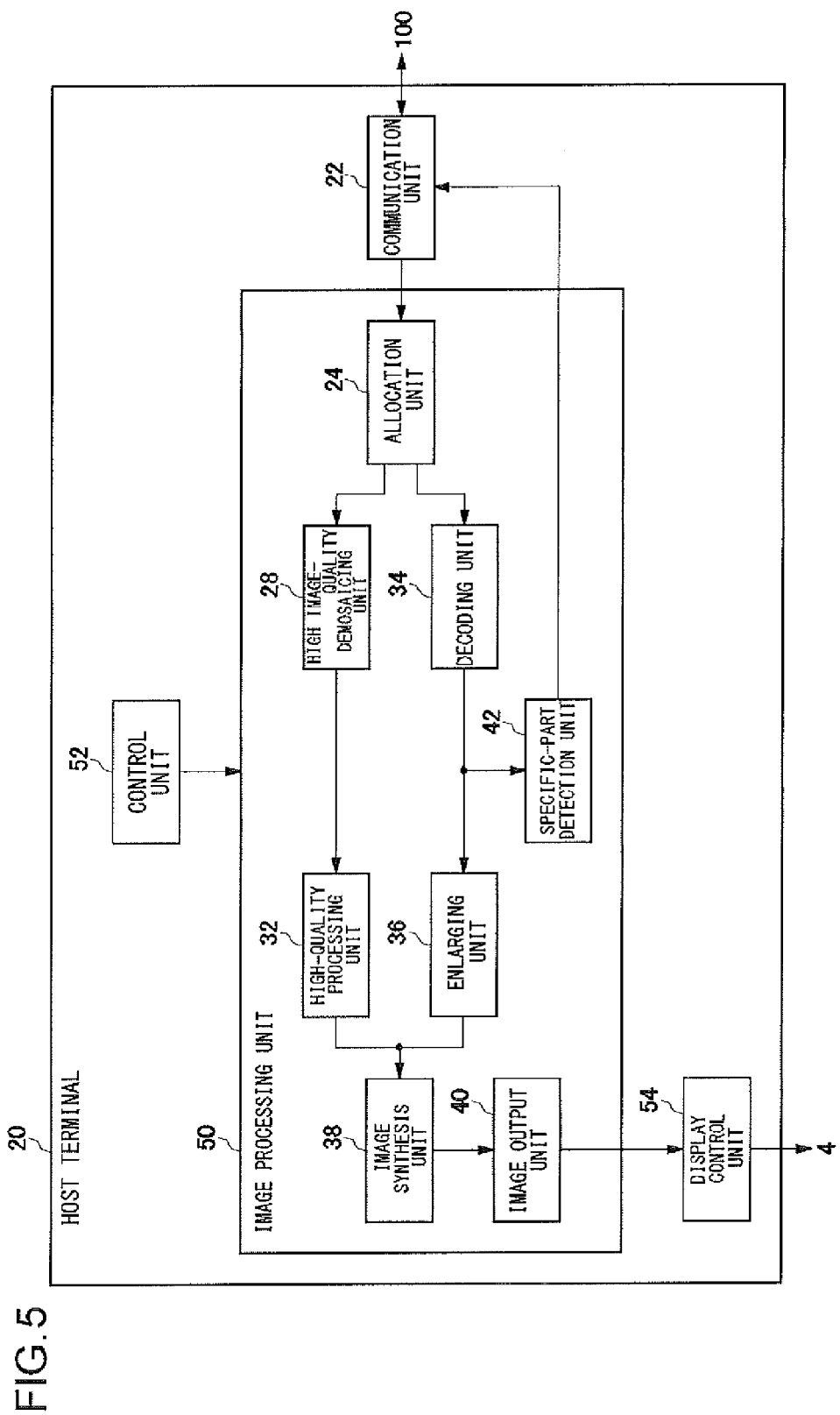
FIG. 5 is a diagram illustrating the configuration of a part of a host terminal that is responsible for outputting a low-latency image.
Figure 6:
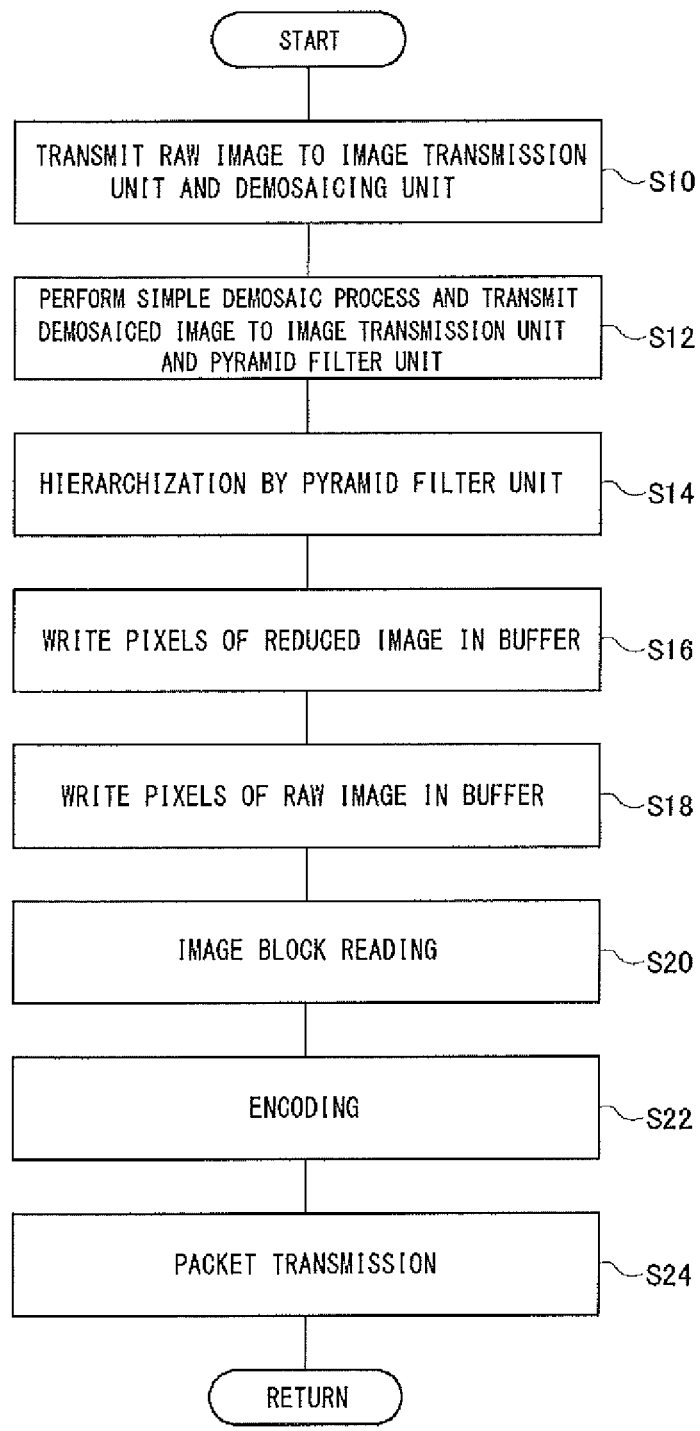
FIG. 6 is a flowchart illustrating the operation of the low-latency camera system.

FIG. 5 illustrates the configuration of a part of a host terminal that is responsible for outputting a low-latency image in the embodiment. These configurations can also be implemented by configurations such as a CPU, a RAM, a ROM, a GPU, and an input and output control apparatus in terms of hardware, and by programs for providing various functions such as data input, data storage, image processing, and rendering in terms of software. FIG. 6 illustrates functional blocks implemented by the cooperation of those components. Therefore, these functional blocks may be implemented in a variety of forms by combinations of hardware and software.

The host terminal 20 includes a communication unit 22, a control unit 52, an image processing unit 50, and a display control unit 54. In addition to allowing an operating system to operate so as to control the overall operation of the image processing unit 50, the control unit 52 performs other control necessary for the host terminal 20, e.g., execution of various applications for a game, chatting, etc., control of a driver, control of the reading of a program from a recording medium, or the like. The communication unit 22 receives various image data sets from the camera 100 and transmits the image data sets to the image processing unit 50.

The image processing unit 50 comprises an allocation unit 24, a high image-quality demosaicing unit 28, a high-quality processing unit 32, a decoding unit 34, an enlarging unit 36, an image synthesis unit 38, an image output unit 40, and a specific-part detection unit 42. Blocks of a specific part of a RAW image and encoded reduced images from the camera 100 are input to the allocation unit 24. Then, in accordance with an instruction from the control unit 52, the allocation unit 24 transmits an image block of the RAW image to the high image-quality demosaicing unit 28, and other image blocks to the decoding unit 34.

The high image-quality demosaicing unit 28 performs a demosaic process on the specific part of the RAW image. In this demosaic process, different from the simple demosaic processing unit of the camera 100, the high image-quality demosaicing unit 28 performs a high image-quality demosaic process utilizing a computational resource of the host terminal 20. An arbitrary algorithm can be used that is existing or that is to be developed in the future for, e.g., using an RGB value of three by three pixels or more for calculating a YCbCr image signal of one pixel, modifying an interpolation coefficient in consideration of a degree of correlation among pixels in a horizontal direction and/or a vertical direction, or the like. Such a demosaic process is disclosed in, for example, Japanese Patent Application Publication No. 7-236147. A demosaiced image is transmitted to the high-quality processing unit 32.

The high-quality processing unit 32 further converts the demosaiced image into a highly-accurate image suitable for viewing. A process performed in this stage varies according to the type of an application. For example, when a face is shown on a large screen for video chatting, appropriate processes such as adjustment of the facial tone, modification of the facial color, modification of the eyes and the mouth, or the like is performed. A high-quality image is transmitted to the image synthesis unit 38.

On the other hand, the decoding unit 34 receives an image block of a reduced image other than the RAW image and then decodes the compressed image by JPEG, or the like. If image compression is not performed in the camera 100, the decoding unit 34 is not necessary.

The specific-part detection unit 42 receives the reduced image decoded by the decoding unit 34. Then, in accordance with a well-known image detection method, the specific-part detection unit 42 identifies a part considered to be particularly important in a user's image for the application. This part is, for example, a user's face in the case of video chatting, and an eye, a mouth, a hand, a leg, or the like in the case of a UI. The position information of the part thus specified is fed back to the camera 100 via the communication unit 22. In accordance with the position information, RAW image blocks around the specific part is transmitted from the camera 100. Thus, the demosaic process is performed on only limited blocks by the high image-quality demosaicing unit.

Detection of a specific part is performed, for example, by a method shown in the following. In the case of face detection, an image is divided into 20 by 20 blocks using only a brightness (Y) signal, and a part comprising a plurality of blocks in which the brightness is relatively brighter is recognized as a face. Alternatively, a reference image of a specific part (a face, a hand, etc.) may be stored in a reference image storage unit (not shown) in advance, and a matching unit (not shown) may perform matching of the reference image and an input image so as to identify an area corresponding to a user's face or hand. After the identification of an area for the face, areas corresponding to an eye, a nose, a mouth, etc., may be further identified in the area for the face by the matching with reference images for the respective parts.

The enlarging unit 36 receives a reduced image (e.g., 1/64) that has been decoded and enlarges the image to a size of 1/1 (same magnification). The enlarged image data is transmitted to the image synthesis unit 38.

The image synthesis unit 38 synthesizes both a low-quality image of a size of 1/1 and a high-quality image block of a specific part. As a result, an image is created where a specific part that is valued in an application has extremely high image quality and high resolution while other parts have low quality and low resolution. The image output unit 40 writes a created synthesized image in a frame buffer (not shown). The display control unit 54 creates a video signal for displaying on the display 4 image data drawn in the frame buffer.

Then, an explanation is given of the action of the host terminal 20. The allocation unit 24 that has received various image blocks from the camera 100 passes a RAW image block to the high image-quality demosaicing unit 28 and other image blocks to the decoding unit 34. When RAW image blocks corresponding to a specific part are collected, the high image-quality demosaicing unit 28 performs a high image-quality demosaic process so as to convert the RAW image blocks into a color image of YCbCr. A high quality specific part image is then obtained by further performing a predetermined process by the high-quality processing unit 32. On the other hand, a block of a reduced image goes through a decoding process in the decoding unit 34 and then becomes enlarged to a size of 1/1 by the enlarging unit 36. Then, the image synthesis unit 38 outputs a synthesized image in which a specific part of the reduced image that has been enlarged is replaced with a high-quality specific part image. Using a Y signal of the reduced image after the decoding, the specific-part detection unit 42 detects the specific part. This information is transmitted to the control unit of the camera and used for selecting a RAW image block in the block writing unit 152. A series of processes described above is repeated on a frame-by-frame basis. As a result, a moving image of the user having an extremely high-quality specific part is created.

Figure 7:
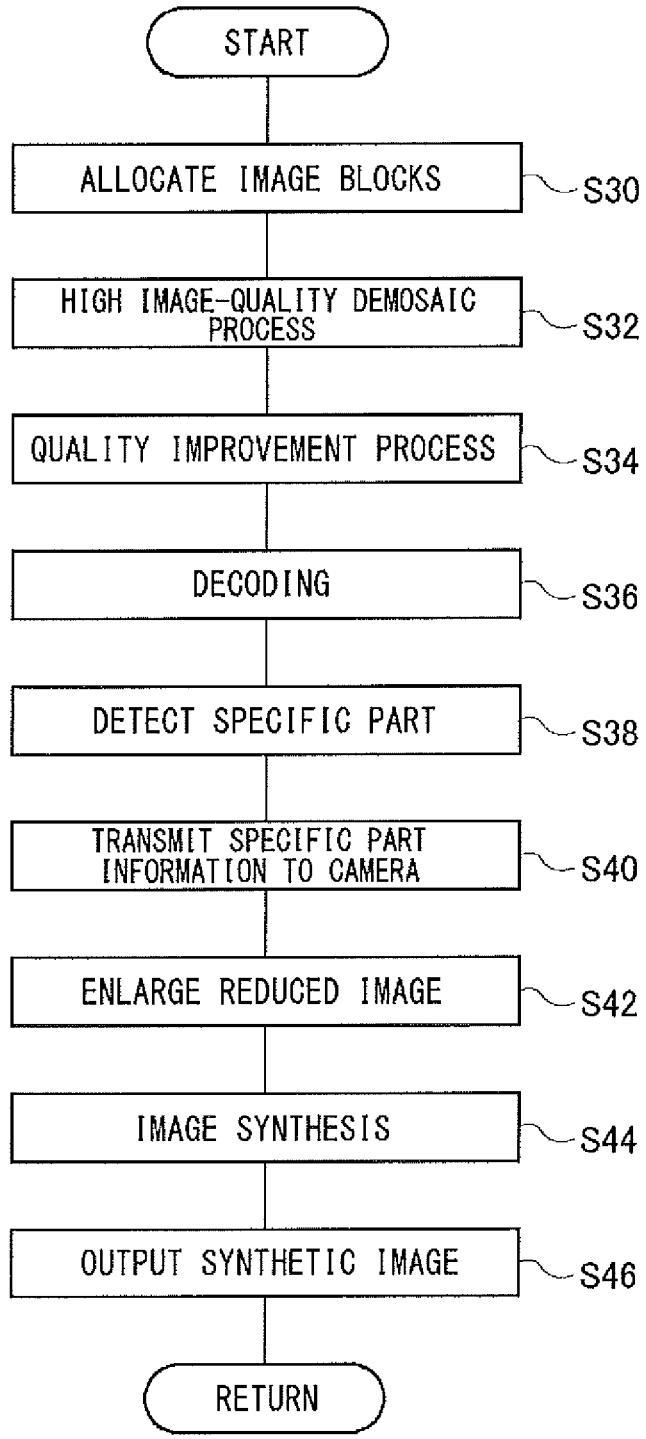
FIG. 7 is a flowchart illustrating the operation of the low-latency camera system.

FIGS. 6 and 7 are flowcharts illustrating the entire operation of the low-latency camera system 10 according to the embodiment. First, an explanation is given of the operation of the camera. When the image acquisition unit 102 receives an image from the imaging element, a RAW image is transmitted to the image transmission unit 150 and the demosaicing unit 104 (S10). The demosaicing unit 104 performs a relatively low image-quality demosaic process on a pixel of the RAW image and transmits demosaiced pixel to the image transmission unit 150 and the pyramid filter unit 170 (S12). Bilinear interpolation is performed by each of the filters of the respective layers of the pyramid filter unit 170, and rows of pixels of sizes of 1/4 through 1/256 are output to the image transmission unit 150 (S14).

In accordance with an instruction from the control unit 164, the block writing unit 152 of the image transmission unit 150 writes a part of a reduced image in the buffer 154 (S16) and, for a RAW image, selects only an image block containing a specific part so as to write the image block in the buffer 154 (S18). Every time pixels for, e.g., eight by eight blocks are recorded in the buffer 154, the block reading unit 156 reads those image blocks and then transmits the image blocks to the encoding unit 158 (S20). After going through predetermined encoding performed in the encoding unit 158 (S22), the image blocks are packetized and then transmitted to the host terminal 20 (S24).

An explanation is now given of the operation of the host terminal shown in FIG. 7. The allocation unit 24 takes various image blocks from a packet received from the camera and transmits the image blocks to the high image-quality demosaicing unit 28 or the decoding unit 34 (S30). After going through a demosaic process performed in the high image-quality demosaicing unit 28 (S32), a RAW image block goes through a predetermined process in the high-quality processing unit 32 and then output to the image synthesis unit 38 (S34). On the other hand, a reduced-image block is decoded in the decoding unit 34 (S36), and a specific part is then detected by the specific-part detection unit 42 using a brightness signal (S38). This information is transmitted to the camera 100 and used for selecting a specific block of the RAW image (S40). The reduced image after the decoding is enlarged to a size of 1/1 by the enlarging unit 36 and output to the image synthesis unit 38 (S42). The image synthesis unit 38 synthesizes a high quality image of the specific part and other enlarged images (S44), and the image output unit 40 outputs a synthesized image to the frame buffer (S46).

The embodiment is based on the understanding that a specific part of a user's image such as a face, a hand, etc., shown on a display desirably has high image quality and high resolution as much as possible and that other backgrounds, or the like may have relatively low image quality. Rather, in an application for video chatting or the like, it is sometimes preferred that a background image have low image quality.

As described above, a brightness signal is sufficient enough for face recognition, and a high image-quality demosaic process is thus not necessary. Nevertheless, in a conventional camera system, a highly-wasteful process is performed in which data compression of an image, for which high image-quality demosaicing is performed by a camera, is further performed so as to realize face recognition using an image after decompression. The embodiment requires less data to be wasted since an image after simple demosaicing is further reduced and used for the face recognition. On the other hand, for a face area, a RAW image can be received from the camera, and high image-quality demosaicing can be performed using computational power of the host terminal 20. With this, despite that the amount of data to be transmitted to the host terminal from the camera is small and that latency is thus small, the image quality of the face area can be further improved compared to a conventional camera system.

In a conventional camera system, there is no other choice but to either transmit the RAW image directly or transmit the RAW image after demosaicing followed by JPEG compression. In the former case, since the amount of data is increased, a communication band becomes a bottleneck, causing latency. In the latter case, since lossy compression is performed, improvement in the image quality in a subsequent stage is limited. In general, demosaicing determines the image quality of an image. However, computational power is used to a great extent for it. Therefore it is advantageous to perform demosaicing in the host terminal having enough computational resources. In the embodiment, since only a specific part such as a face, a hand, or the like in a RAW image is transmitted to the host terminal, the amount of data to be transmitted is small, and latency can thus be reduced. At the same time, the degree of freedom for improvement of the image quality by using the RAW image in the host terminal can be greatly increased.

Figure 8:
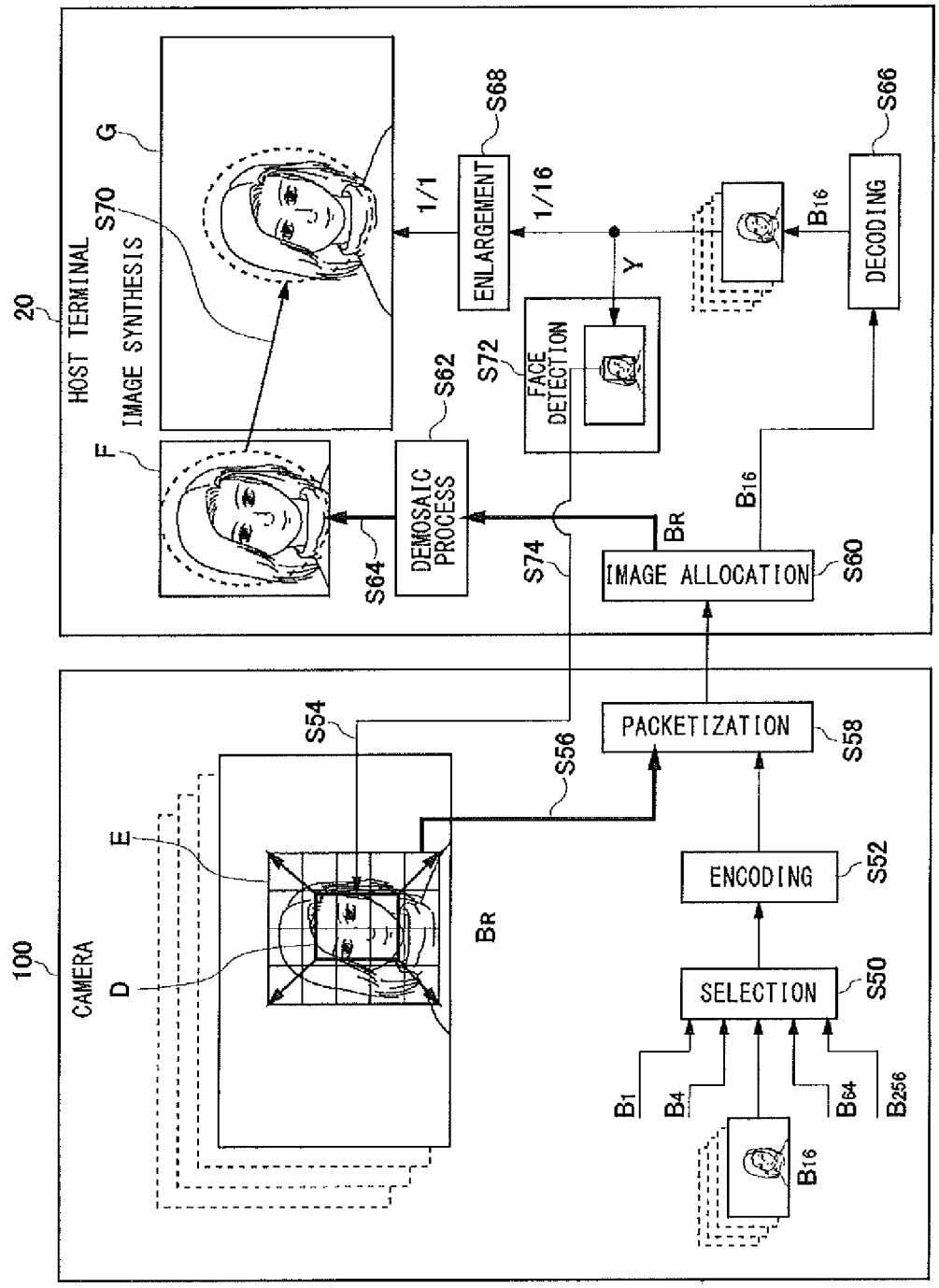
FIG. 8 is a diagram illustrating the outline of an image process when the low-latency camera system is applied to a video chat application.

FIG. 8 is a diagram illustrating the outline of an image process when the low-latency camera system 10 according to the embodiment is applied to a video chat application. In this example, a camera and a host terminal are connected via a USB, and it is assumed that an application program is in operation in which a face part of a user who is video chatting is detected and then the image is transmitted, having high image-quality and high resolution image for the face part, to a host terminal of a chat destination.

In this application, it is assumed that the camera 100 is instructed by the host terminal 20 to transmit only a RAW image and a 1/16 reduced image. A 1/16-reduced-image block B16 is selected by the size selection unit 152A (S50) and encoded by the encoding unit 158 (S52). For the RAW image, the block writing unit 152 receives position information of a specific part from the host terminal (S54), and the unit 152B for selecting a block to be cut out selects a range E as a specific part block and outputs the specific part block (S56), the range E being obtained by vertically and horizontally expanding an area D specified by the position information of a face recognition result by a predetermined pixels. This is because, while only a skin-color part is recognized in the face recognition, an image of the entire head part is necessary for chatting. This range is preferably set so that the range falls in line with the boundary of blocks. The specific part block of the RAW image and reduced-image block thus obtained are packetized and transmitted to the host terminal 20 (S58).

In the host terminal 20, the specific part block of the RAW image goes through a demosaicing process and a high-quality process (S62) and is output as a high-quality image (S64). The reduced image goes through a decoding process (S66) and is further enlarged to a 1/1 size (S68). Image synthesis for replacing a part corresponding to the user's head in the enlarged image with a high quality image is performed (S70), and a synthesized image is output. At the same time, a Y signal of the reduced image is used for the face detection (S72), and the position information of a detected face is fed back to the camera 100 (S74) and used for selecting a specific part block.

A process for the face recognition may be performed at all time during video chatting. However, in practice, it is sufficient to perform the process for every plurality of frames with a predetermined time interval (e.g., every one second). This is because 60 frames or more are normally output per second for a moving image such that the user's head does not move a lot between frames.

As in this example, a face image is most important in the case of an application for video chatting, and the degree of importance is low for other body parts, a background, and the like. Therefore, a face image of high image quality and high definition can be obtained by cutting only a block corresponding to a face part from the RAW image and then performing a demosaic process and a high-definition process, which use the cut block, by using sufficient computational resources of the host terminal. At the same time, by using a compressed image for parts other than a face, traffic between the camera and the host terminal can be reduced, and latency can thus be reduced.

As explained above, according to the present embodiment, a RAW image is received from a camera, and a high image-quality demosaic process is performed in a host terminal for a part necessary to have high image quality and high resolution. For other parts that may have low image quality and low resolution, a reduced image is received from the camera and enlarged for use. As a result, latency due to processes performed inside the camera and in the communication between the camera and the host can be suppressed while ensuring a partially high image quality image. Therefore, a response that is faster than ever before can be realized in an application of a user interface. Therefore, there is a possibility that, for example, cursor movement, dial operation, game player operation, or the like can be achieved on a screen based on image recognition of user's gesture with high responsivity. Also, an image with smooth movement and less latency can be provided in an application for video chatting. As described, only image data that meets the needs for each application can be selected and transmitted.

Recently, the number of pixels has increased even in inexpensive webcams, and scan speed has also increased by employing CMOS as an imaging element. In order to transmit an image of large size, high compression must be carried out in a camera. However, that will increase the processing time of the camera. Therefore, latency associated with processes performed within the camera and communication has become more apparent than before. In other words, although the ability of the imaging element and the ability of the host terminal have been improved, what is in between the two becomes a bottleneck, and the ability thereof cannot be fully taken advantage of. However, if a host terminal having high computing performance can be prepared, it is more advantageous to receive a RAW image that has not been processed by a camera since there is no deterioration in image quality, thus allowing for, e.g., post processing of white balance and exposure.

In the embodiment, demosaicing in the camera is simplified so as to reduce latency, and, for a part that needs to have high image quality and high resolution for a recognition process or the like, a RAW image is directly received from the camera so as to perform demosaicing in a host terminal having high computing performance. Therefore, the performance of the imaging element can be fully taken advantage of while reducing the latency.

Furthermore, reduced images hierarchized by a pyramid filter are prepared at all times in the camera. Thus, the host terminal can request a reduced image of a size necessary for an application that is running at any time. For example, if the user remains stationary, a specific part of a RAW image just need to be fixed from the beginning and used at all times. However, such a situation is less likely to happen in reality. In the embodiment, a specific part of a RAW image can be received, and the user's movement can be tracked using reduced images at all times so as to detect the movement of a part for the face or the hand. Thus, a block of the RAW image to be requested can be appropriately changed in accordance with the movement. Regarding the size of a reduced image to be require, a reduced image of an optimal size can be selected according to the size of a face or hand of the user to be detected, the number of users, the size of the movement of the user, etc.

Also, the size of a buffer necessary for an image process is allowed to be small in the block writing unit and the block reading unit. This is because while the block writing unit writes in the buffer pixels from the simple demosaicing unit or the pyramid filter unit every time image scanning is performed for one row by the imaging element, the block reading unit reads pixels for one block from the buffer every time the pixels for one block are stored and transmits a packet.

Also, in an image processing device according to the embodiment, it is not necessary to provide a recognition process device or the like in the camera as in a conventional device, thus allowing hardware to be small. A camera system with low latency can be established only by adding a pyramid filter unit and an image transmission unit to an existing digital video camera.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

Optional combinations of the constituting elements described in the embodiments, and implementations of the invention in the form of methods, apparatuses, systems, computer programs, and recording mediums may also be practiced as additional modes of the present invention. In addition to processes performed in the order thereof and in chronological order, the method described as a flowchart in the subject specification includes processes performed in parallel or individually.

In the embodiment, a specific block is selected only for a RAW image. However, a specific block may be selected for other demosaiced images. For example, when detecting gesture of a hand, a hand part is determined to be a specific part with reference to a user's face, and a demosaic image of a hand area is transmitted to a host terminal. When the movement of the user is large, the movement can be tracked using a coarse image, i.e., a demosaic image of a small size. When the movement of the user is small, a fine image, i.e., a demosaic image of a large size is used. As described, since hierarchized image data are prepared by a pyramid filter at all times in the camera, a required image size can be appropriately changed according to the speed and size of the user's movement. Similarly, even when the number of users is increased to two, a RAW image block can be promptly selected again since a whole image is being monitored. Furthermore, processing a specific part using a RAW image allows for detection of a small movement such as a movement of a fingertip, which is extremely difficult in the recognition with use of a conventional camera.

In the embodiment, it is described that a demosaic process in the camera is simplified compared to that of the host terminal. However, if an effect of latency associated with a demosaic process is relatively small, a demosaic process having equivalent performance as the host terminal may be performed. In other words, as long as a demosaic process is performed in accordance with an algorithm that is different in the camera and the host terminal, the type of an algorithm for a demosaic process is not limited in the present invention. With this, two types of demosaiced images can be treated in the host terminal, and the degree of freedom is increased for composing a synthesized image to be output to a display.

In the embodiment, it is described that an entire reduced image is transmitted from the camera to the host terminal. Alternatively, only a part of a reduced image may be transmitted. For example, only a Y signal of a reduced image of 1/16 and a CbCr signal of a reduced image of 1/64 may be transmitted in consideration of the properties of JPEG.

In the embodiment, a personal computer or a game console is shown as a host terminal. Alternatively, a host terminal may be a laptop computer, a portable game device, or the like. In this case, a camera is preferably mounted on or incorporated in, for example, the top of a display.

In the embodiment, it is described that detection of a user's face, hand, etc., is performed in the host terminal. Alternatively, the detection may be performed in the camera. For example, it is considered that latency to be increased is relatively small for a recognition process that uses a brightness signal such as face recognition. In this case, a block of a RAW image corresponding to a face can be selected in the camera and then transmitted to the host terminal without waiting for an instruction form the host terminal.

An explanation is given as an application for when user's gesture is used in an interface and for when video chatting is performed. The present invention can be applied, with necessary modifications, to an arbitrary application where a part of a body or gesture of a user is received with recognition serving as an input and an arbitrary application where the image of the user is used.

DESCRIPTION OF THE REFERENCE NUMERALS 4 display
6 user
10 low-latency camera system
20 host terminal
22 communication unit
24 allocation unit
28 high image-quality demosaicing unit
32 high-quality processing unit
34 decoding unit
36 enlarging unit
38 image synthesis unit
40 image output unit
42 specific-part detection unit
50 image processing unit
52 control unit
54 display control unit
100 camera
102 image acquisition unit
104 demosaicing unit
106 simple demosaic processing unit
108 communication unit
110 first filter
120 second filter
130 third filter
140 fourth filter
150 image transmission unit
152 block writing unit
154 buffer
156 block reading unit
158 encoding unit
160 packetizing unit
162 packet buffer
164 control unit
170 pyramid filter unit According to the present invention, a high-resolution partial image using a raw image can be obtained for a specific part while reducing latency associated with image communication from an image-capturing device to a host terminal.

The invention claimed is:

1. A moving image processing program embedded on a non-transitory computer-readable recording medium that operates in a moving image processing device, allowing the moving image processing device to achieve:
   an image acquisition module configured to acquire an unprocessed image that is captured using an imaging element;
   a demosaicing module configured to perform a demosaic process on the unprocessed image to produce a demosaiced image;
   a filtering module configured to convert the demosaiced image into a plurality of reduced whole images whose resolutions vary in stages;
   a selection module configured to select a part of the unprocessed image as a specific raw part and also to select any one of the plurality of reduced whole images as a specified reduced whole image; and
   a transmission module configured to transmit to a host terminal for further image processing the specific raw part of the unprocessed image and the specified reduced whole image that has been selected.

2. The moving image processing program according to claim 1, wherein the selection module selects, in accordance with an instruction provided by the host terminal, a specific raw part of the unprocessed image as an area to be set to have high image quality in an image.

3. The moving image processing program according to claim 2, wherein the selection module selects, in accordance with an instruction provided by the host terminal, the specified reduced whole image as a background image to be combined with the specific raw part.

4. The moving image processing program according to claim 1, wherein the selection module includes:
   a writing module configured to select and write in a buffer a pixel value corresponding to the specific raw part every time a pixel value of the unprocessed image is output from the imaging element and to select and write in the buffer a pixel value corresponding to the specified reduced whole image every time a pixel value of a reduced whole image that is converted by the filtering module is received; and
   a reading module configured to read a pixel value from the buffer every time the pixel value stored in the buffer reaches that for a predetermined size of an image block.

5. A moving image processing program embedded on a non-transitory computer-readable recording medium that operates in a host terminal that processes a moving image that is captured by an image-capturing device and then output the processed moving image to a display, allowing the host terminal to achieve:
   a module configured to receive both a specific raw part that is a part of an unprocessed image output from an imaging element and a reduced whole image obtained by performing a demosaic process and a reduction process on the unprocessed image;
   a module configured to perform the demosaic process on the specific raw part of the unprocessed image;
   a module configured to convert the reduced whole image into a full-size image by enlarging the reduced whole image to a size equal to that of the unprocessed image; and
   a module configured to combine the specific raw part on which the demosaic process has been performed and the full-size image so as to output a synthesized image with partially different resolutions to the display.

6. The moving image processing program according to claim 5 further comprising a specific-part detection module configured to detect, using the reduced whole image, a specific raw part to be set to have high image quality in an image.

7. The moving image processing program according to claim 5, wherein a user using an application that uses the host terminal is to be captured by the image-capturing device, and wherein the specific raw part is a part of the body of the user who provides an operation instruction to the application.

8. A non-transitory computer-readable recording medium having embodied thereon the moving image processing program according to claim 1.

9. A moving image processing device comprising:
   an image acquisition unit configured to acquire an unprocessed image that is captured using an imaging element;
   a demosaic processing unit configured to perform a demosaic process on the unprocessed image to produce a demosaiced image;
   a filtering unit configured to convert the demosaiced image into a plurality of reduced whole images whose resolutions vary in stages;
   a selection unit configured to select a part of the unprocessed image as a specific raw part and also to select any one of the plurality of reduced whole images as a specified reduced whole image;
   a transmission unit configured to transmit to a host terminal for further image processing the specific raw part of the unprocessed image and the specified reduced whole image that have been selected.

10. An image-capturing device provided with the moving image processing device according to claim 9.

11. A host terminal for displaying a moving image captured by an image-capturing device on a display, comprising:
    a reception unit configured to receive from the image-capturing device both: a specific raw part that is a part of an unprocessed image captured using an imaging element and a reduced whole image obtained by performing a demosaic process and a reduction process on the unprocessed image;
    a demosaicing unit configured to perform the demosaic process on the specific raw part of the unprocessed image;
    an enlarging unit configured to output the reduced whole image as a full-size image by enlarging the reduced whole image to a size equal to that of the unprocessed image; and
    an image synthesis unit configured to combine the specific raw part on which the demosaic process has been performed and the full-size image so as to output a synthesized image with partially different resolutions to the display.

12. An image-capturing system for processing in a host terminal a moving image captured by an image-capturing device and then outputting the processed moving image to a display, wherein
    the image-capturing device comprises:
    an image acquisition unit configured to acquire an unprocessed image that is captured using an imaging element;
    a first demosaic processing unit configured to perform a demosaic process on the unprocessed image to produce a demosaiced image;
    a filtering unit configured to convert the demosaiced image into a plurality of reduced whole images whose resolutions vary in stages;

a selection unit configured to select a part of the unprocessed image as a specific raw part and also to select any one of the plurality of reduced whole images as a specified reduced whole image; and a transmission unit configured to transmit to a host terminal for further image processing the specific raw part of the unprocessed image and the specified reduced whole image that have been selected, and wherein the host terminal comprising:

a reception unit configured to receive from the image-capturing device both: a specific raw part that is a part of an unprocessed image captured using an imaging element, and a reduced whole image obtained by performing a demosaic process and a reduction process on the unprocessed image;

a second demosaic processing unit configured to perform the demosaic process on the specific raw part of the unprocessed image;

an enlarging unit configured to output the reduced whole image as a full-size image by enlarging the reduced whole image to a size equal to that of the unprocessed image; and an image synthesis unit configured to combine the specific raw part on which the demosaic process has been performed and the full-size image so as to output a synthesized image with partially different resolutions to the display.

13. The image-capturing system according to claim 12, wherein the processing capacity of the first demosaic processing unit of the image-capturing device is lower than that of the second demosaic processing unit of the host terminal.

14. A moving image processing method comprising:

acquiring and storing in a buffer an unprocessed image that is captured using an imaging element;

performing a demosaic process on the unprocessed image to produce a demosaiced image;

converting, using a pyramid filter, the demosaiced image into a plurality of reduced whole images whose resolutions vary in stages;

selecting a part of the unprocessed image as a specific raw part and also selecting any one of the plurality of reduced whole images as a specified reduced whole image;

transmitting to a host terminal for further image processing the specific raw part of the unprocessed image and the specified reduced whole image that have been selected.

15. A moving image processing method for processing in a host terminal a moving image that is captured by an image-capturing device and then outputting the processed moving image to a display, comprising:

receiving both a specific raw part that is a part of an unprocessed image output from an imaging element and a reduced whole image obtained by performing a demosaic process and a reduction process on the unprocessed image;

performing the demosaic process on the specific raw part of the unprocessed image;

converting the reduced whole image into a full-size image by enlarging the reduced image to a size equal to that of the unprocessed image; and combining the specific raw part on which the demosaic process has been performed and the full-size image so as to output a synthesized image with partially different resolutions to the display.

16. A non-transitory computer-readable recording medium having embodied thereon the moving image processing program according to claim 5.

* * * * *